(12) United States Patent
Yokoyama (10) Patent No.: US 7,356,024 B1
(45) Date of Patent: Apr. 8, 2008

(54) COMMUNICATION APPARATUS AND COMMUNICATION METHOD

(75) Inventor: Yoji Yokoyama, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1311 days.

(21) Appl. No.: 09/869,267

(22) PCT Filed: Oct. 27, 2000

(86) PCT No.: PCT/JP00/07536

§ 371 (c)(1),
(2), (4) Date: Aug. 9, 2001

(87) PCT Pub. No.: WO01/33809

PCT Pub. Date: May 10, 2001

(30) Foreign Application Priority Data

Oct. 29, 1999 (JP) ................................. 11-309005

(51) Int. Cl.
*H04L 12/50* (2006.01)
*H04Q 11/00* (2006.01)

(52) U.S. Cl. ..................................................... 370/381

(58) Field of Classification Search ................ 370/381,
370/332–335, 342, 318, 263, 468, 347, 208,
370/458, 234, 328, 329, 341, 465, 432, 489,
370/419–421, 493, 440, 285, 352, 345, 394,
370/392, 466, 469, 538, 389, 400, 401, 260,
370/459, 380, 395, 362; 375/147, 285, 229,
375/130, 148, 377, 258, 105, 240, 375.26,
375/240.24, 240.16, 240.03, 240.12; 358/400;
725/39, 136, 240.12; 455/453, 522; 379/93.31,
379/202.01; 709/227, 203, 226, 217, 219;
348/461, 468, 387.1, 14.11; 714/716, 752;
710/69; 386/98; 713/151, 168; 707/201,
707/203
See application file for complete search history.

(56) References Cited

U.S. PATENT DOCUMENTS 3,833,887 A * 9/1974 Shevlin ...................... 358/400

(Continued)

FOREIGN PATENT DOCUMENTS

| JP | 63191437 | 8/1988 |
|---|---|---|
| JP | 01241997 | 9/1989 |
| JP | 06014170 | 1/1994 |
| JP | 9073422 | 3/1997 |
| JP | 10155010 | 6/1998 |

OTHER PUBLICATIONS

Toga et al, "Demystifying Multimedia Conferencing Over the Internet Using the H.323 set of Standards," Intel Technology Journal Q2' 1998.*

*Primary Examiner*—Wing Chan
*Assistant Examiner*—Prenell Jones
(74) *Attorney, Agent, or Firm*—DIckinson Wright, PLLC (57) ABSTRACT

A correlation memory section 105 stores a prescribed table in which each control data is grouped for each kind of it (for each message unit) to be correlated to each other. A control data synchronization section 104 successively accumulates input control data into a control data accumulation section 106. At this time, the control data synchronization section 104 refers a table stored in the correlation memory section 105 to correlate a plurality of control data for each group for accumulating the control data. By such operation, a plurality of control data are multiplexed for each group, and the control data are handled by the group as one data. Then, a control data processing section 107 generates multiplexed control data that are multiplexed for each group as one packet, and the control data processing section 107 transmits the generated packet to a communicating party.

15 Claims, 9 Drawing Sheets

U.S. PATENT DOCUMENTS

| | | | | |
|---|---|---|---|---|
| 4,007,338 A | * | 2/1977 | McLaughlin | 370/263 |
| 4,261,054 A | * | 4/1981 | Scharla-Nielsen | 455/13.4 |
| 4,864,562 A | * | 9/1989 | Murakami et al. | 370/538 |
| 5,450,359 A | * | 9/1995 | Sharma et al. | 710/69 |
| RE35,104 E | * | 11/1995 | Murakami et al. | 370/468 |
| 5,515,375 A | * | 5/1996 | DeClerck | 370/468 |
| 5,526,353 A | * | 6/1996 | Henley et al. | 370/392 |
| 5,619,499 A | * | 4/1997 | Nakabayashi | 370/469 |
| 5,737,338 A | * | 4/1998 | Eguchi et al. | 714/716 |
| 5,748,677 A | * | 5/1998 | Kumar | 375/285 |
| 5,757,767 A | * | 5/1998 | Zehavi | 370/208 |
| 5,910,959 A | * | 6/1999 | Olafsson et al. | 714/752 |
| 5,923,655 A | * | 7/1999 | Veschi et al. | 370/394 |
| 6,026,083 A | * | 2/2000 | Albrow et al. | 370/347 |
| 6,049,570 A | * | 4/2000 | Fukunaga et al. | 375/240.12 |
| 6,055,242 A | * | 4/2000 | Doshi et al. | 370/458 |
| 6,101,168 A | * | 8/2000 | Chen et al. | 370/228 |
| 6,178,237 B1 | * | 1/2001 | Horn | 379/202.01 |
| 6,236,805 B1 | * | 5/2001 | Sebestyen | 386/98 |
| 6,360,265 B1 | * | 3/2002 | Falck et al. | 709/227 |
| 6,396,840 B1 | * | 5/2002 | Rose et al. | 370/401 |
| 6,505,347 B1 | * | 1/2003 | Kaneko et al. | 725/39 |
| 6,563,810 B1 | * | 5/2003 | Corazza | 370/335 |
| 6,611,508 B1 | * | 8/2003 | Abe | 370/332 |
| 6,633,552 B1 | * | 10/2003 | Ling et al. | 370/318 |
| 6,678,311 B2 | * | 1/2004 | Odenwalder | 375/147 |
| 6,937,612 B1 | * | 8/2005 | Mauger et al. | 370/465 |
| 6,947,408 B1 | * | 9/2005 | Liberti et al. | 370/345 |
| 2003/0123470 A1 | * | 7/2003 | Kim et al. | 370/437 |
| 2004/0237122 A1 | * | 11/2004 | Yamaguchi et al. | 725/136 |
| 2006/0153237 A1 | * | 7/2006 | Hwang et al. | 370/469 |

* cited by examiner

| GROUP 1 | MASTER SLAVE DETERMINING |
|---|---|
| | TERMINAL ABILITY INFORMATION EXCHANGING |
| GROUP 2 | LOGIC CHANNEL ESTABLISHING (IMAGE) |
| | LOGIC CHANNEL ESTABLISHING (VOICE) |
| | LOGIC CHANNEL ESTABLISHING (DATA) |
| GROUP 3 | MULTIPLEXED INFORMATION (IMAGE) |
| GROUP 4 | LOGIC CHANNEL ESTABLISHMENT RESPONSE (IMAGE) |
| | LOGIC CHANNEL ESTABLISHMENT RESPONSE (VOICE) |
| | LOGIC CHANNEL ESTABLISHMENT RESPONSE (DATA) |

COMMUNICATION APPARATUS AND COMMUNICATION METHOD

TECHNICAL FIELD

The present invention relates to a communication apparatus and a communication method, and more particularly to a communication apparatus and a communication method to be used for multimedia communication in International Telecommunication Union (ITU).

BACKGROUND ART

Conventionally, in digital communication, multimedia communication is performed through the following processes. That is, moving picture data, voice data and other data are compressed in conformity with a compression system of a prescribed standard; image data stream, voice data stream and other data stream that were obtained by the compression are multiplexed; and the multiplexed stream data is transmitted.

Before the transmission of the stream data, control data is exchanged between communication terminals in regard to a moving picture coding system, a voice coding system, a data transmission system, or the like. Then, after the communication system to be performed within the abilities of the communication terminals is determined, resources necessary for the communication are prepared. Not until these processes are completed the transmission of the stream data is begun.

As for the exchanges of the control data before the beginning of the transmission of the stream data, ITU-T standard H.245 (hereinafter, referred as to "H.245 standard") is currently used. This standard is a communication control protocol that was developed for AV multimedia communication using packet multiplexing, and is adopted by many multimedia communication terminals.

In the H.245 standard, after the beginning of communication, at first, the exchanges of control data concerning the abilities of communication terminals and reception acknowledgment signals with regard to the control data are performed between communication terminals, and the exchanges of the information for the determination of the classification of the communication terminals and the superiority or inferiority of the communication terminals are performed. These exchange steps are called as "transmission starting phase 1". In the transmission starting phase 1, exchanges of control data and reception acknowledgment signals concerning the control data are performed as many times as the number of media (voice, image, and so forth). After the transmission starting phase 1, the abilities of transmitter-receiver terminals are settled, and the logical connection of each medium is established. This step is called as "transmission starting phase 2". After the completion of the transmission starting phase 2, the exchange of multiplexing information for the packet multiplexing of data and a reception acknowledgment signal with regard to the multiplexing information is performed. This exchange is called as "transmission starting phase 3". Not until all of these processes of the transmission starting phases 1-3 are completed the transmission of the stream data is begun.

However, the H.245 standard adopts an acknowledgment type process configuration such that, after a communication terminal transmitted control data to a communicating party and received the reception acknowledgment signal (ACK, NACK) of the control data from the communicating party, the communication terminal transmits the next control data.

Such a process configuration guarantees the sure transmission of control data. However, such a process configuration has a problem such that the larger the number of control data necessary for being exchanged before the beginning of the transmission of stream data becomes, the longer the necessary time before the beginning of the transmission of the stream data becomes. Incidentally, in the H.245 standard, generally, after about twenty control data were exchanged, the transmission of stream data is begun. Hereinafter, the problem is described in detail with the aid of FIG. 1.

Figure 1:
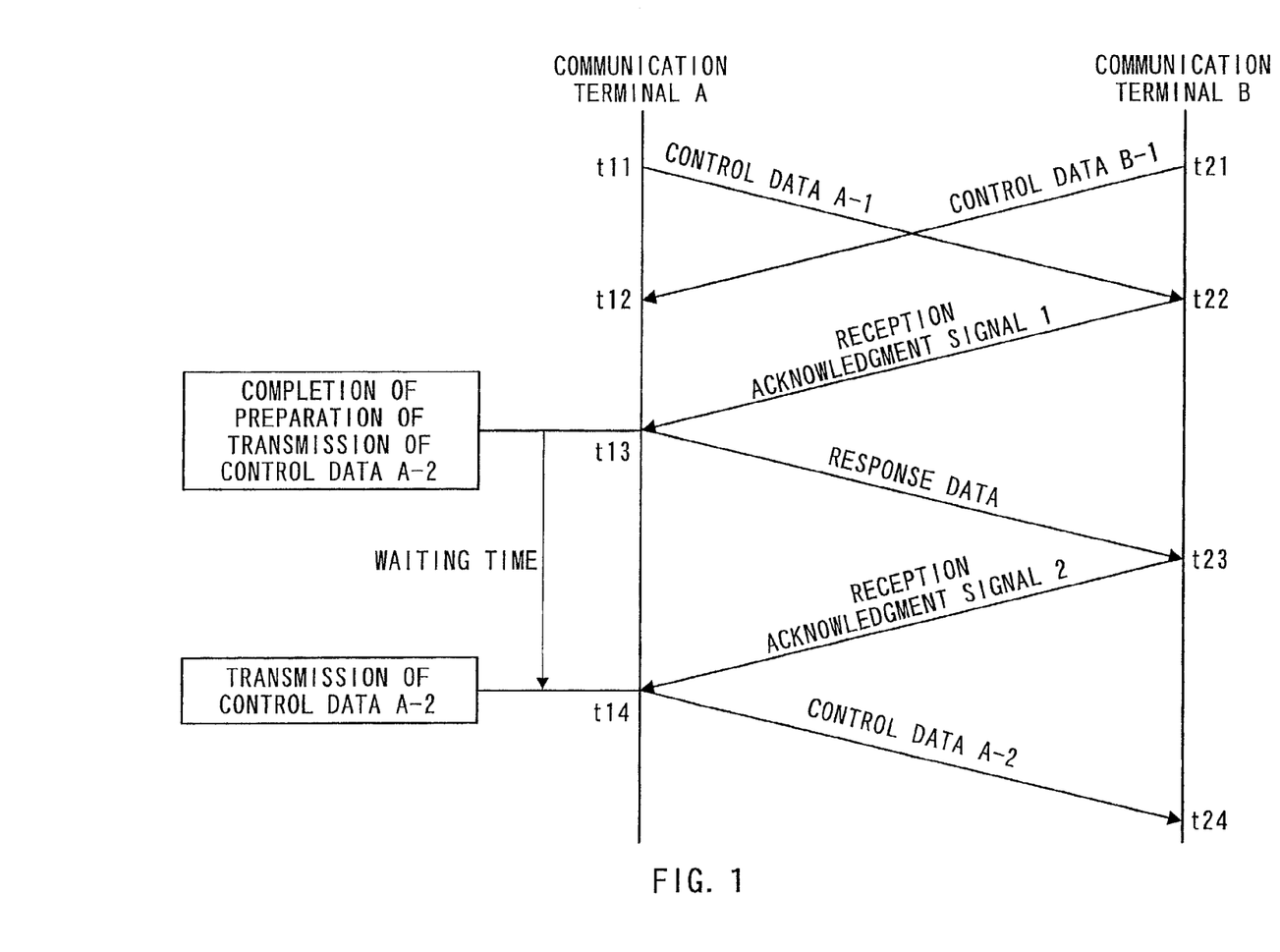
FIG. 1 is a sequence diagram showing a state of exchanges of control data by communication terminals equipped with a conventional communication apparatus, severally.

FIG. 1 is a sequence diagram showing a state of exchanging of control data between communication terminals equipped with a conventional communication apparatus severally. In FIG. 1, at the timing (hereinafter, abbreviated to as "t") 11 and t21, communication terminals A and B respectively transmit control data A-1 and control data B-1 to the other parties of communication. Incidentally, the problem is described in the following description on the basis of the operation of the communication terminal A for convenience of description.

After the communication terminal A transmitted the control data A-1, the communication terminal A generates control data A-2 to be transmitted at the next time. When the communication terminal B received the control data A-1 at t22, the communication terminal B transmits a reception acknowledgment signal 1 to the communication terminal A as a reply. When the communication terminal A received the reception acknowledgment signal 1 at t13, it becomes possible for the communication terminal A to transmit the next data. Accordingly, the communication terminal A transmits response data to an inquiry in the control data B-1 that the communication terminal A received at t12 to the communication terminal B at t13. Now, it is supposed that the preparation of the transmission of the control data A-2 to be transmitted from the communication terminal A at the next time has already completed at t13 in the communication terminal A.

When the communication terminal B received the response data at t23, the communication terminal B transmits a reception acknowledgment signal 2 to the communication terminal A as a reply. When the communication terminal A received the reception acknowledgment signal 2 at t14, it becomes possible for the communication terminal A to transmit the next data. Consequently, the communication terminal A transmits the control data A-2 the transmission preparation of which has completed at t13 at t14.

As described above, because the communication terminal A cannot transmits control data A-2 before the reception of the reception acknowledgment signal 2 in the 1H.245 standard, awaiting time shown in FIG. 1 is generated with respect to the transmission of the control data A-2.

The larger the number of control data necessary to be exchanged before the beginning of the transmission of stream data becomes, the higher the frequency of generation of such a waiting time becomes. Consequently, the larger the number of control data becomes, the longer the necessary time before the beginning of the transmission of stream data becomes.

DISCLOSURE OF INVENTION

An object of the present invention is to supply a communication apparatus and a communication method that can shorten the waiting time concerning the transmission of control data and that can reduce the delay of the beginning of the transmission of stream data.

For attaining the aforesaid object, the present invention is configured so as to decrease the number of times of exchanges of control data by transmitting a plurality of control data that can be transmitted before the arrival of response data from the communicating party as one multiplexing unit in a multiplexed state.

BEST MODE FOR CARRYING OUT THE INVENTION

In the following, embodiments of the present invention are described in detail by reference to the attached drawings.

Embodiment 1

The Communication Apparatus and the Communication method according to Embodiment 1 of the present invention correlate a plurality of control data that can collectively be transmitted and a plurality of control data that are asynchronously generated, and the apparatus and the method multiplex the plural control data in conformity with the correlation to be one packet, and then the apparatus and the method transmit the packet.

Figure 2:
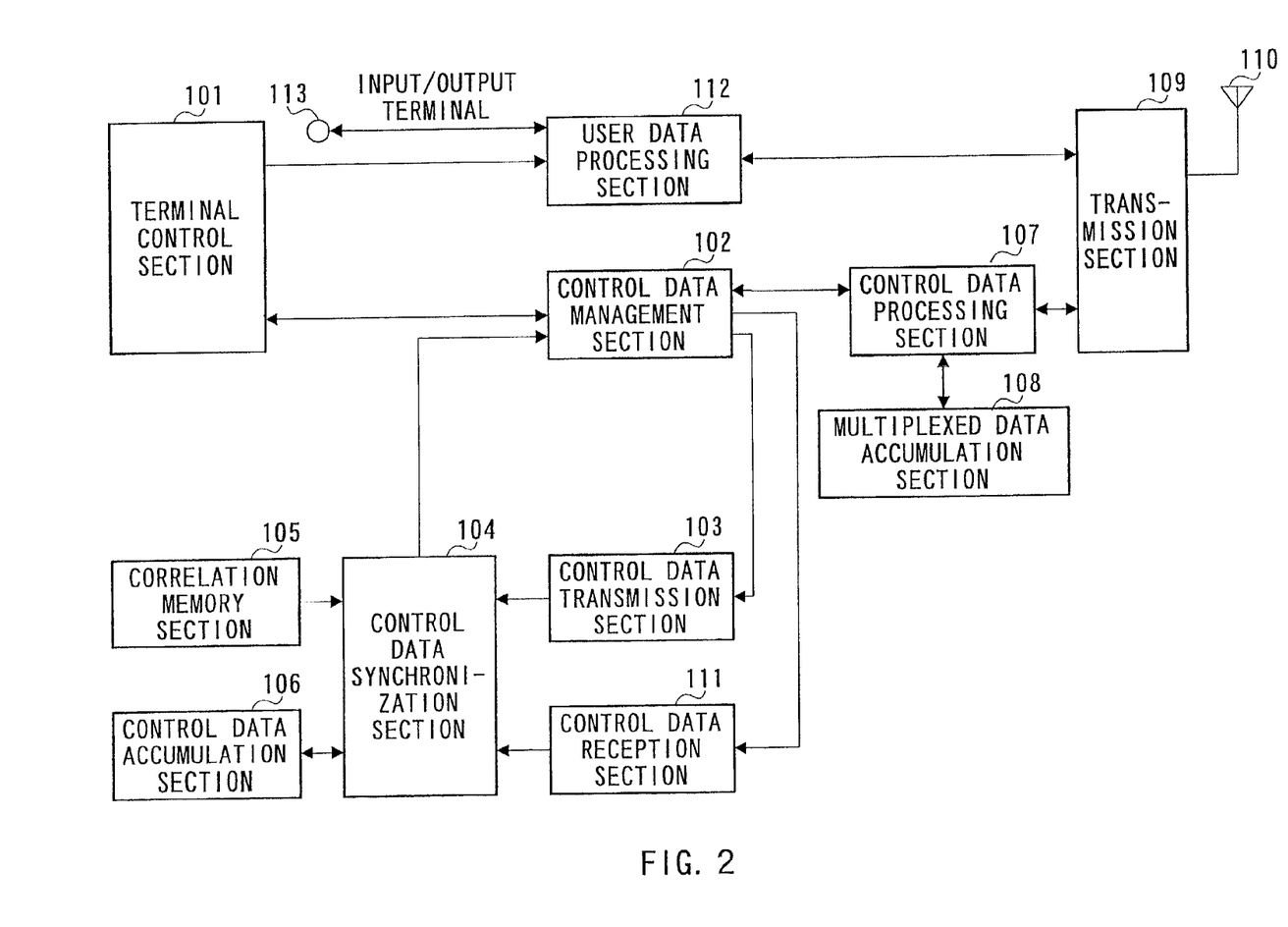
FIG. 2 a principal part block diagram showing a schematic configuration of a communication apparatus according to Embodiment 1 of the present invention.

Hereinafter, the communication apparatus and the communication method according to Embodiment 1 of the present invention are described by means of FIG. 2. FIG. 2 is a principal part block diagram showing a schematic configuration of the communication apparatus according to Embodiment 1 of the present invention.

A control data management section 102 that was instructed by a terminal control section 101 to start to communicate outputs a transmission instruction of control data to a control data transmission section 103. The control data transmission section 103 that received the transmission instruction generates transmission control data to output the generated transmission control data to a control data synchronization section 104.

When control data necessary for being transmitted successively exist, the control data management section 102 again transmits the transmission instruction to the control data transmission section 103. Receiving the transmission instruction, the control data transmission section 103 again generates transmission control data to output the generated transmission control data to the control data synchronization section 104.

The control data synchronization section 104 cooperates with a correlation memory section 105 and a control data accumulation section 106 to multiplex a plurality of transmission control data. The multiplexed transmission control data is output to the control data management section 102. Incidentally, the operation of the multiplexing will be described later.

The data output to the control data management section 102 is output to a control data processing section 107 by the control data management section 102, and then the output data is temporarily stored in a multiplexed data accumulation section 108. Then, when the control data processing section 107 detected the reception of a reception acknowledgment signal transmitted from the communicating party, the control data processing section 107 takes out multiplexed transmission control data from the multiplexed data accumulation section 108 and adds a sequence number, an error detection code and the like to the taken out transmission control data to generate the added control data as one packet. Consequently, the packet includes a plurality of transmission control data. After header information and other information were added to the generated packet in the transmission section 109, the packet is processed in conformity with prescribed radio processing in the transmission section 109, and the processed packed is transmitted to the communicating party through an antenna 110.

On the other hand, after control data that were received through the antenna 110 were processed in conformity with prescribed radio processing in the transmission section 109, the processed control data is output to the control data processing section 107. The control data processing section 107 performs the processing of the received control data such as error detection. When the received control data were correctly received, the control data processing section 107 outputs a reception acknowledgment signal to the transmission section 109, and further the control data processing section 107 outputs the received control data to the control data management section 102. After being processed in conformity with the prescribed radio processing in the transmission section 109, the reception acknowledgment signal is transmitted to the communicating party through the antenna 110.

The control data management section 102 outputs the received control data output from the control data processing section 107 to a control data reception section 111. The control data reception section 111 analyzes the contents of the received control data. When a response is needed to an inquiry in the received control data, the control data reception section 111 generates response data and output the generated response data to the control data synchronization section 104. Incidentally, in the following description, transmission control data to be generated by the control data transmission section 103 and response data to be generated by the control data reception section 111 is generically named as "control data". Moreover, data generated by the multiplexing of a plurality of control data is called as "multiplexed control data".

The control data synchronization section 104 cooperates with the correlation memory section 105 and the control data accumulation section 106 to multiplex response data and transmission control data. The multiplexed data is output to the control data management section 102. Incidentally, the operation of the multiplexing will be described later. Because the processing after that until the multiplexed data is transmitted is similar to that described above, the description concerning the processing is omitted.

In such a way, after the completion of the exchanges of control data in each transmission starting phase between communication terminals equipped with the aforesaid communication apparatus severally, the transmission of stream data such as voice data and image data is started. That is, after the completion of the exchanges of control data, the terminal control section 101 outputs a starting signal to a user data processing section 112, and thereby the user data processing section 112 is started.

The user data processing section 112 performs the prescribed processing (e.g. operation processing in the MPEG-4 system) of user data such as voice data and image data that is input through the input/output terminal 113, and the user data processing section 112 generates transmission stream data to output the generated transmission stream data to the transmission section 109. Moreover, after the user data processing section 112 performed the prescribed processing of the received stream data output from the transmission section 109, the user data processing section 112 outputs the processed stream data to another apparatus through the input/output terminal 113.

Next, the multiplexing operation of control data by the control data synchronization section 104, the correlation memory section 105 and the control data accumulation section 106 is described.

Figure 3:
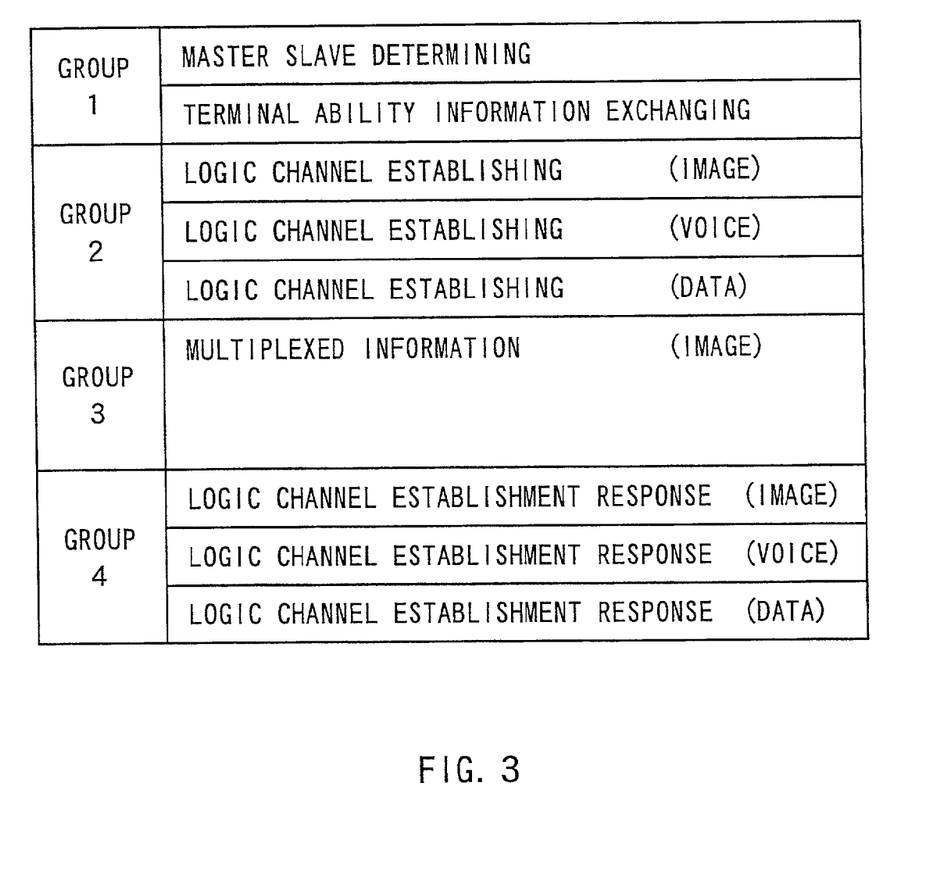
FIG. 3 is a diagram showing an example of the contents of a table stored in the correlation memory section of the communication apparatus according to Embodiment 1 of the present invention.

In the correlation memory section 105, a prescribed table such as one shown in FIG. 3, in which each control data are correlated by being grouped for each kind (by the message), is stored. FIG. 3 is a diagram showing an example of the contents of a table stored in the correlation memory section of a communication apparatus according to Embodiment 1 of the present invention.

Now, each message that belongs to a certain group in the table shown in FIG. 3 is a message capable of being collectively transmitted to the communicating party. That is, because "terminal ability information exchanging message" is a message capable of being transmitted without the wait of the response data from the communicating party to "master slave determining message", the "master slave determining message" and the "terminal ability information exchanging message" can collectively be transmitted to the communicating party. Accordingly, the "master slave determining message" and the "terminal ability information exchanging message" are grouped into one group.

On the other hand, because the ability of the communicating party cannot be known without the wait of the response data from the communicating party to the "terminal ability information exchanging message", the "terminal ability information exchanging message" and "logic channel establishing message" cannot collectively be transmitted to the communicating party. Accordingly, the "terminal ability information exchanging message" and the "logic channel establishing message" are grouped into different groups.

Incidentally, the correlation memory section 105 is configured such that the stored contents can adaptively be changed according to communication conditions. That is, when voiceless communication is performed, there is no need to establish any voice logic channel. Accordingly, the table shown in FIG. 3 becomes a table in which "logic channel establishing (voice)" is omitted from the group 2 in the table shown in FIG. 3.

The control data synchronization section 104 accumulates input control data into the control data accumulation section 106 in sequence. When the control data synchronization section 104 accumulates control data, the control data synchronization section 104 judges which group the control data to be accumulated belongs to by reference to the table that is stored in the correlation memory section 105 and shown in FIG. 3. Then, the control data synchronization section 104 correlates a plurality of control data to each other for each group for managing them as one data by the group. According to such operation, a plurality of control data are multiplexed for each group and are handled as one data by the group.

To put it concretely, for example, when "master slave determining message" is input into the control data synchronization section 104, the control data synchronization section 104 judges that the "master slave determining message" belongs to group 1. Moreover, because "terminal ability information exchanging message" exists after the "master slave determining message" in the group 1, the control data synchronization section 104 can know that the "terminal ability information exchanging message" will successively be input after the "master slave determining message". Accordingly, in this case, the control data synchronization section 104 accumulates the "master slave determining message" into the control data accumulation section 106 as control data that belongs to the group 1.

Moreover, when input control data is data at the last in each group, the control data synchronization section 104 accumulates the control data into the control data accumulation section 106, and then the control data synchronization section 104 takes out a plurality of control data that have been accumulated by that time and have been multiplexed from the control data accumulation section 106 as one data, and the control data synchronization section 104 outputs the taken out control date to the control data management section 102. After the outputting, the control data synchronization section 104 clears the control data accumulation section 106.

To put it concretely, for example, when "terminal ability information exchanging message" was input into the control data synchronization section 104, because the "terminal ability information exchanging message" is a control data being at the last in the group 1, the control data synchronization section 104 accumulates the "terminal ability information exchanging message" into the control data accumulation section 106, and then takes out "master slave determining message" and the "terminal ability information exchanging message" from the control data accumulation section 106 as one data to output them to the control data management section 102.

The multiplexed control data output to the control data management section 102 is output to the control data processing section 107 by the control data management section 102, and the output control data is temporarily stored in the multiplexed data accumulation section 108. Then, the control data processing section 107 takes out multiplexed control data from the multiplexed data accumulation section 108 in order for each time when the control data processing section 107 detects a reception acknowledgment signal transmitted from the communicating party, and the control data processing section 107 adds a sequence number, an error detection code and the like to the taken out multiplexed data to generate the multiplexed data as one packet for each group. Consequently, the packet includes a plurality of transmission control data. After header information and other information are added to the generated packet in the transmission section 109, the packet is processed in conformity with the prescribed radio processing to be transmitted to the communicating party through the antenna 110.

Figure 4:
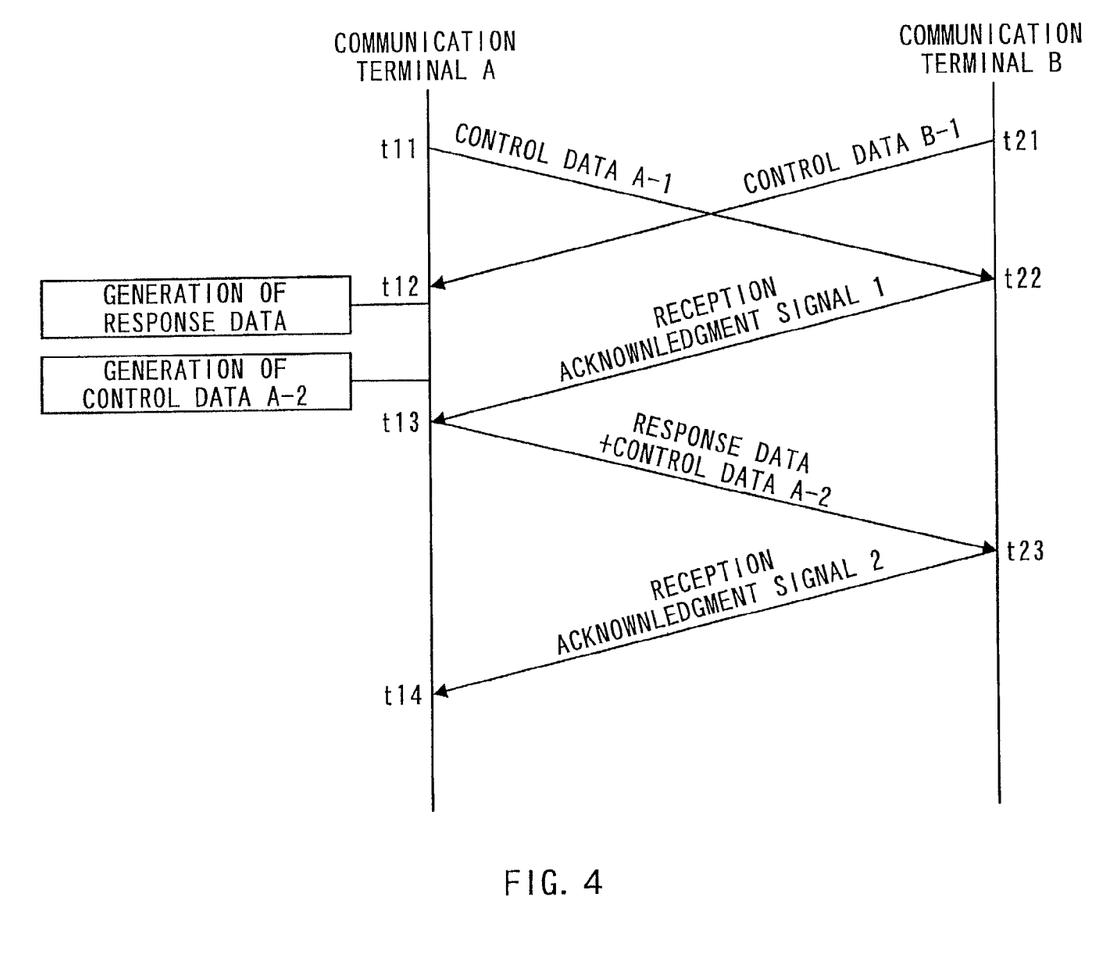
FIG. 4 is a sequence diagram showing a sate of the exchanges of control data by communication terminals equipped with the communication apparatus according to Embodiment 1 of the present invention, severally.

Next, a state of exchanges of control data by communication terminals equipped with the communication apparatus having the aforesaid configuration, severally, is described. FIG. 4 is a sequence diagram showing a state of exchanges of control data by communication terminals equipped with the communication apparatus according to Embodiment 1 of the present invention, severally.

In FIG. 4, at the timing (hereinafter, abbreviated to as "t") 11 and t21, communication terminals A and B respectively transmit control data A-1 and control data B-1 to the other parties of communication. Incidentally, the description is performed in the following description on the basis of the operation of the communication terminal A for convenience of description.

The communication terminal A generates response data to an inquiry in control data B-1, which the communication terminal A received at t12, in the control data reception section 111. The response data is accumulated in the control data accumulation section 106.

Moreover, after the communication terminal A transmitted the control data A-1, the communication terminal A generates control data A-2 to be transmitted at the next time in the control data transmission section 103. The control data A-2 is accumulated in the control data accumulation section 106. Thereby, the response data and the control data A-2 are multiplexed.

Incidentally, now it is supposed here that the control data A-1 and the control data A-2 are control data that belong to different groups. Moreover, it is also supposed that the response data and the control data A-2 are control data that belong to the same group.

When the communication terminal B received the control data A-1 at t22, the communication terminal B transmits a reception acknowledgment signal 1 to the communication terminal A as a reply. Because it becomes possible for the communication terminal A that received the reception acknowledgment signal 1 at t13 to transmit the next data, the communication terminal A makes the data generated by the multiplexing of the response data and the control data A-2 one packet in the control data processing section 107, and the communication terminal A transmits the packet to the communication terminal B at t13. By the transmission of a plurality of control data as one packet after the multiplexing of them, the number of times of transmission of control data can be reduced. Moreover, because the communication terminal A multiplexes the response data and the control data A-2 to one packet and then transmits the packet, the waiting time that was conventionally generated as shown in FIG. 1 can be shortened.

Then, when the communication terminal B received the packet including the response data and the control data A-2, the communication terminal B transmits a reception acknowledgment signal 2 to the communication terminal A at t23. The reception acknowledgment signal 2 is received by the communication terminal A at t14.

Figure 5:
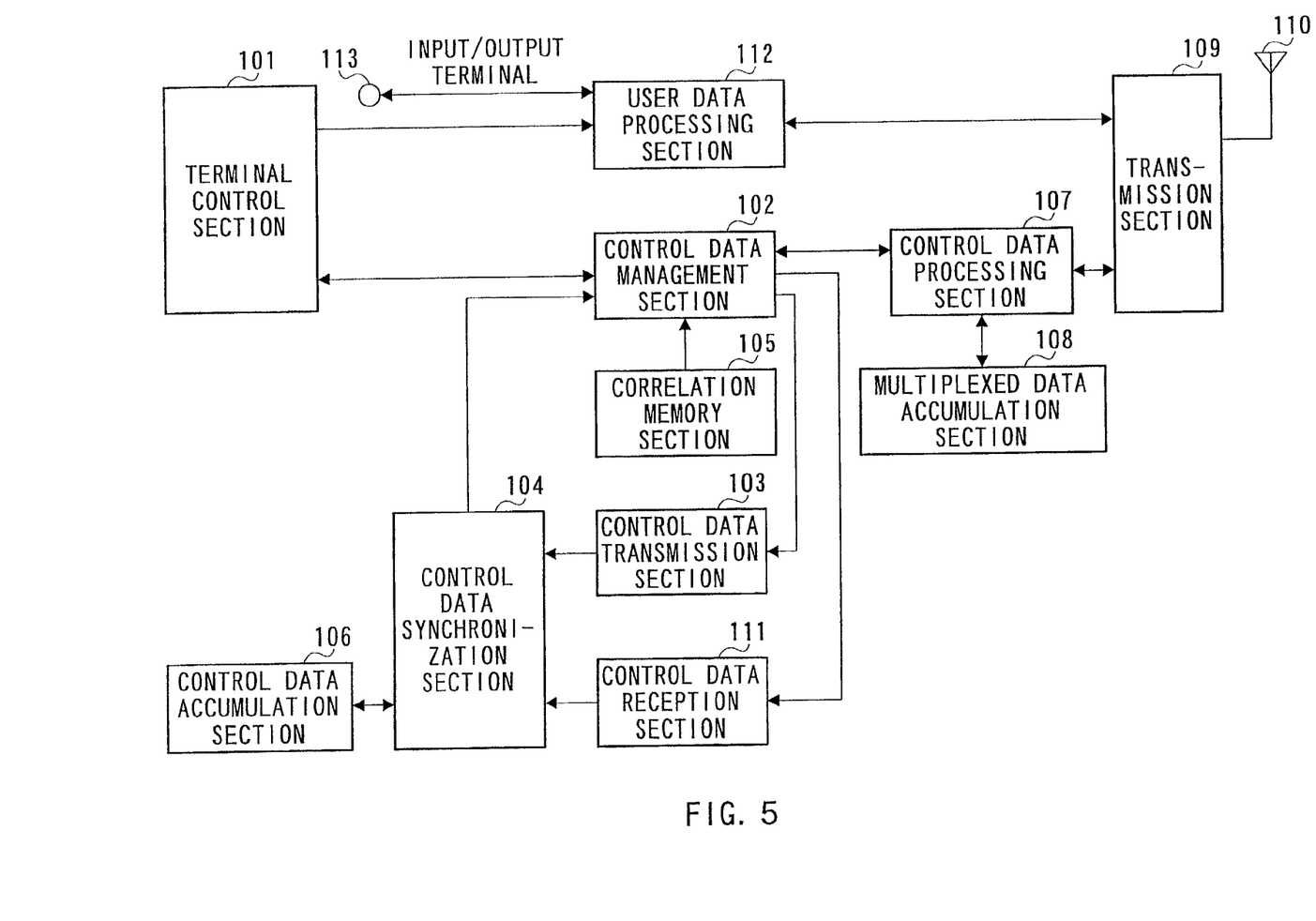
FIG. 5 is a principal part block diagram showing another schematic configuration of the communication apparatus according to Embodiment 1 of the present invention.

Incidentally, the communication apparatus according to the present embodiment may have a configuration shown in FIG. 5. FIG. 5 is a principal part block diagram showing another schematic configuration of the communication apparatus according to Embodiment 1 of the present invention. In the communication apparatus shown in FIG. 5, the control data management section 102 outputs an instruction signal concerning the inputting and the outputting of control data to the control data accumulation section 106 to the control data synchronization section 104 by reference to the correlation memory section 105. The control data synchronization section 104 accumulates input control data into the control data accumulation section 106 or takes out accumulated multiplexed control data from the control data accumulation section 106 in a form of one data in conformity with the instruction signal.

As described above, the communication apparatus and the communication method according to the present embodiment correlates a plurality of control data that can collectively be transmitted and a plurality of control data that are asynchronously generated to each other, and the apparatus and the method multiplexes the plural control data in conformity with the correlation to transmit the multiplexed control data as one packet. Thereby, waiting time concerning the transmission of control data can be shortened and the number of times of exchanges of control signals can be decreased. Consequently, the delay of transmission starting of stream data caused by the waiting time can be reduced.

Embodiment 2

The point of the communication apparatus and the communication method according to the present embodiment different from those of Embodiment 1 is that the apparatus and the method of the present embodiment further multiplexes a plurality of control data that were multiplexed in conformity with correlation to make them as one packet and then the apparatus and the method transmits the packet.

Figure 6:
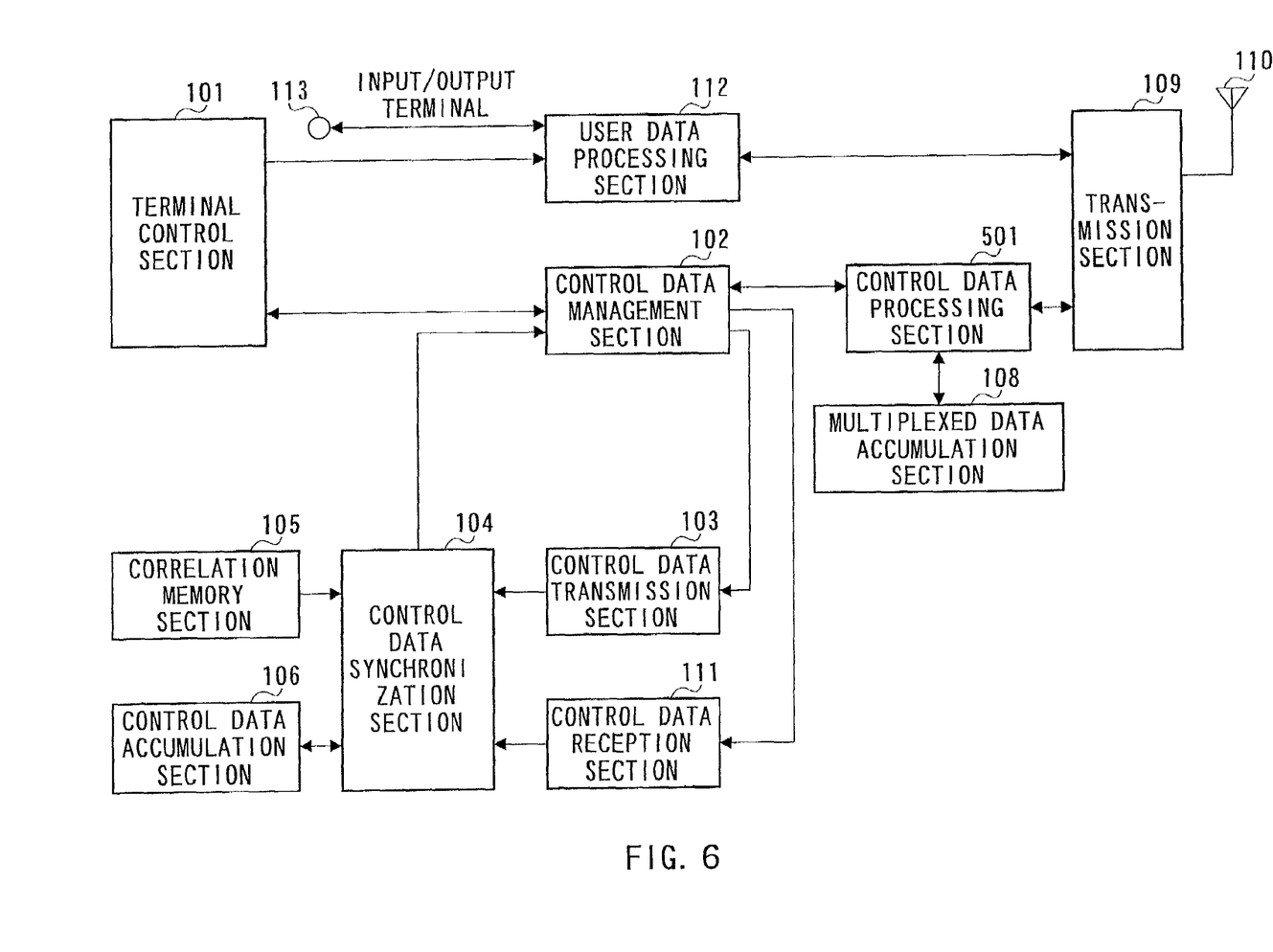
FIG. 6 is a principal part block diagram showing a schematic configuration of a communication apparatus according to Embodiment 2 of the present invention.
Figure 7:
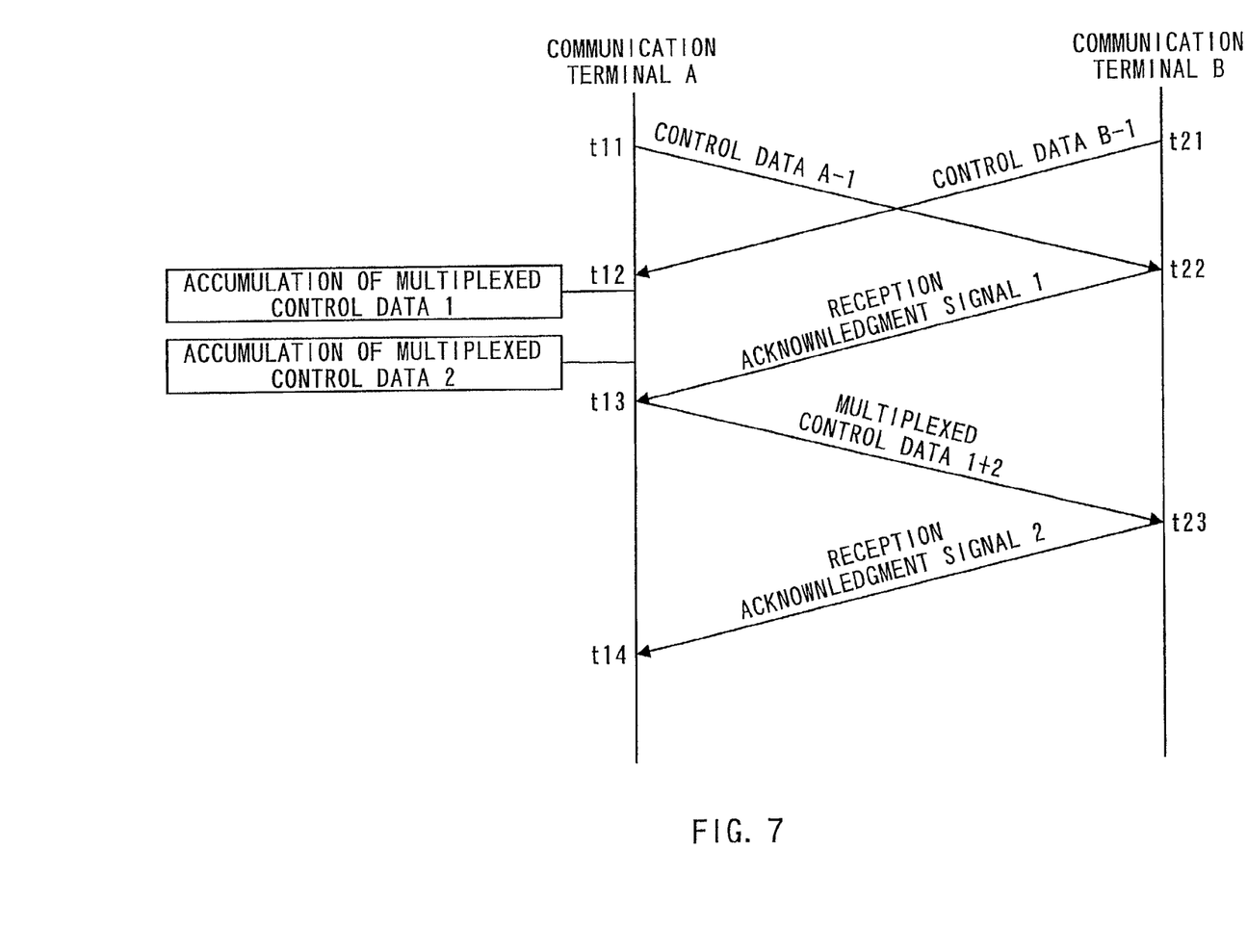
FIG. 7 is a sequence diagram showing a state of exchanges of control data by communication terminals equipped with the communication apparatus according to Embodiment 2 of the present invention, severally.

Hereinafter, the communication apparatus and the communication method according to Embodiment 2 of the present invention are described by the use of FIG. 6 and FIG. 7. FIG. 6 is a principal part block diagram showing a schematic configuration of the communication apparatus according to Embodiment 2 of the present invention, and FIG. 7 is a sequence diagram showing a state of exchanges of control data by communication terminals equipped with the communication apparatus according to Embodiment 2 of the present invention, severally. Incidentally, in FIG. 6, the same configuration elements as those of Embodiment 1 are designated by the same reference marks as those of Embodiment 1, and their detailed descriptions are omitted.

Because the control data processing section 501 cannot transmit multiplexed control data until the control data processing section 501 receives a reception acknowledgment signal transmitted from the communicating party, as shown in FIG. 7, the control data processing section 501 successively accumulates multiplexed control data output from the control data management section 102 in the multiplexed data accumulation section 108 for a period of time until the control data processing section 501 receives the reception acknowledgment signal. Now, here, it is supposed that, for example, two multiplexed control data of multiplexed control data 1 and multiplexed control data 2 are accumulated. Thereby, a plurality of control data that were multiplexed by the group are further multiplexed by a plurality of groups.

When the control data processing section 501 detects the reception of a reception acknowledgment signal at t13 shown in FIG. 7, the control data processing section 501 takes out all of the multiplexed control data (the multiplexed control data 1 and the multiplexed control data 2) that have been accumulated until that time from the multiplexed data accumulation section 108, and the control data processing section 501 adds a sequence number, an error detection code and the like to the taken out multiplexed control data to generate the added control data as one packet, and further the control data processing section 501 outputs the packet to the transmission section 108. Thereby, the control data multiplexed between a plurality of groups are transmitted to the communicating party as one packet. After outputting, the control data processing section 501 clears the multiplexed data accumulation section 108.

As described above, the communication apparatus and the communication method according to the present embodiment further multiplex a plurality of control data that were multiplexed in conformity of correlation to make the multiplexed control data one packet, and then the apparatus and the method transmit the packet. Thereby, the number of times of exchanges of control signals can further be reduced and the transmission efficiency of control signals can be heightened in comparison with Embodiment 1. Consequently, necessary time before the transmission starting of stream data can further be shortened.

Embodiment 3

The point of the communication apparatus and the communication method of the present embodiment different from those of Embodiment 2 is that the communication apparatus and the communication method of the present embodiment do not transmit control data that were multiplexed between a plurality of groups at the time of receiving of a reception acknowledgment signal but transmit the multiplexed control data at a prescribed time interval.

Figure 8:
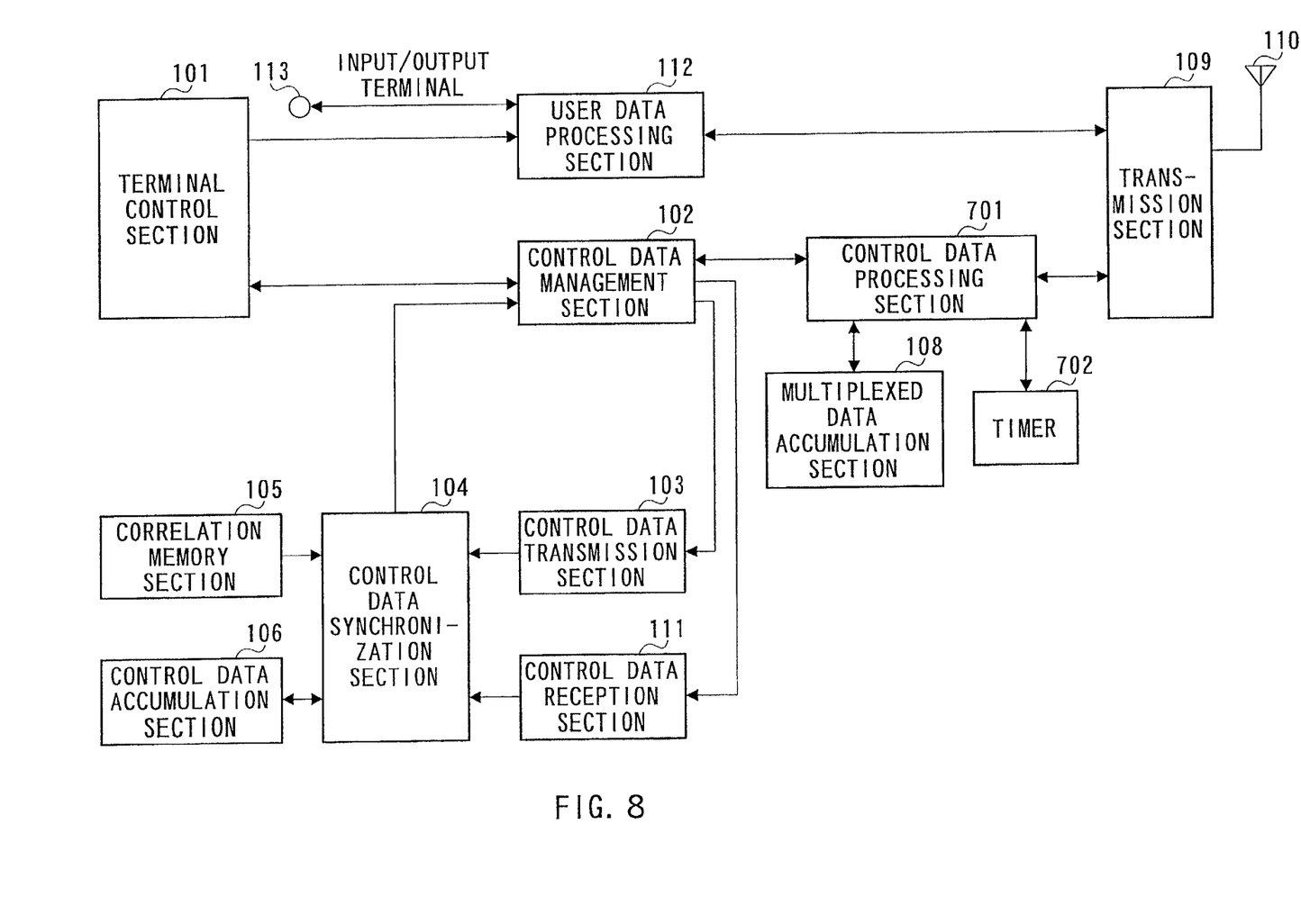
FIG. 8 is a principal part block diagram showing a schematic configuration of a communication apparatus according to Embodiment 3 of the present invention.
Figure 9:
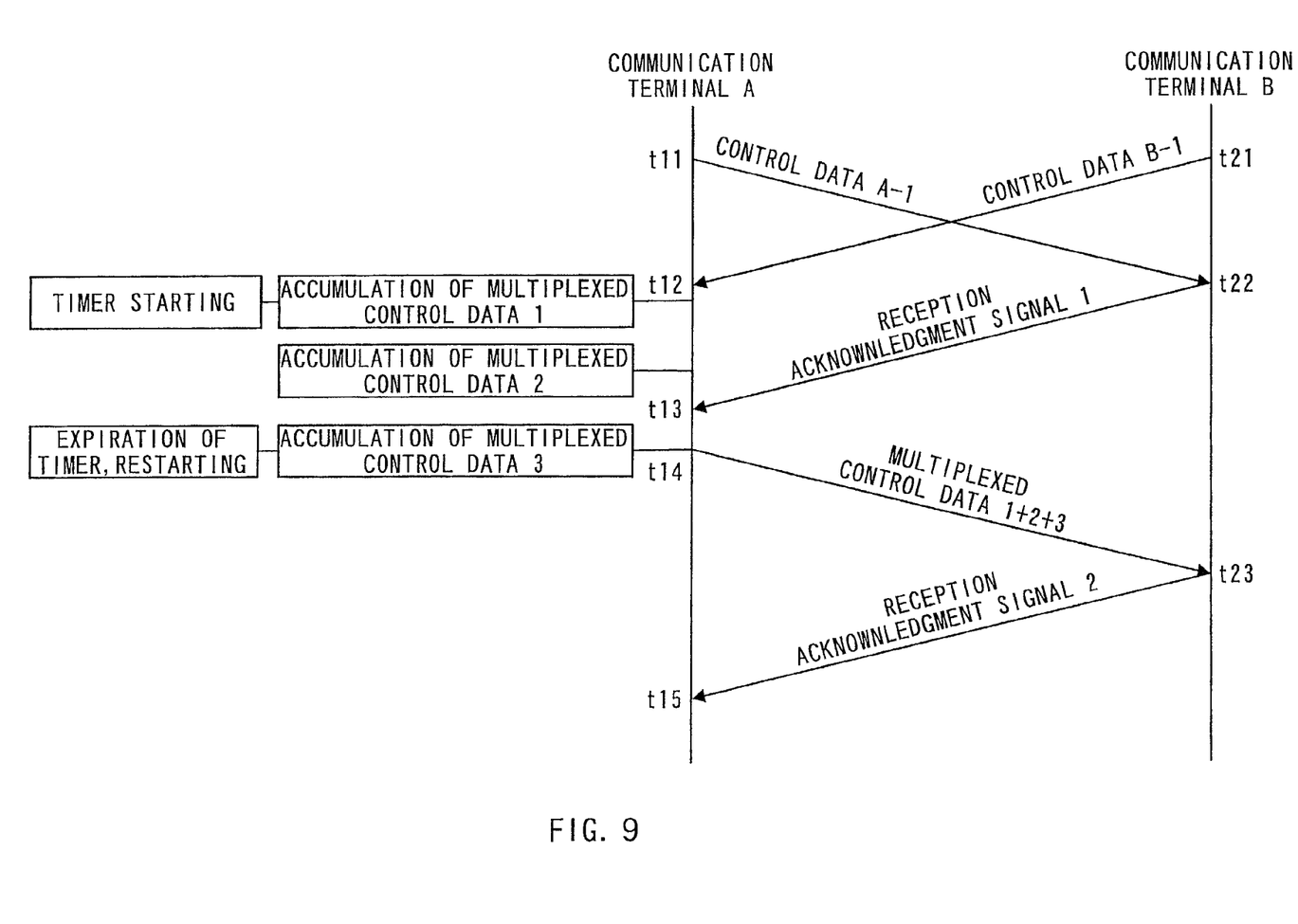
FIG. 9 is a sequence diagram showing a state of exchanges of control data by communication terminals equipped with the communication apparatus according to Embodiment 3 of the present invention, severally.

Hereinafter, the communication apparatus and the communication method according to Embodiment 3 of the present invention are described by the use of FIG. 8 and FIG. 9. FIG. 8 is a principal part block diagram showing a schematic configuration of a communication apparatus according to Embodiment 3 of the present invention, and FIG. 9 is a sequence diagram showing a state of exchanges of control data by communication terminals equipped with a communication apparatus according to Embodiment 3 of the present invention, severally. Incidentally, in FIG. 8, the same configuration elements as those of Embodiment 2 are designated by the same reference marks as those of Embodiment 2, and their detailed descriptions are omitted.

At some generation timing of multiplex control data, such as a case where the generation frequency of multiplexed control data is high, such a case can be conceivable as the next multiplexed control data is output from the control data management section 102 to the control data processing section 701 immediately after the control data processing section 701 received a reception acknowledgment signal. In this case, if the multiplexed control data output immediately after the reception of the reception acknowledgment signal is also included in one packet to be transmitted, the transmission efficiency can more be improved. Accordingly, the communication apparatus and the communication method according to the present embodiment are configured such that one packet is generated by including multiplexed control data output immediately after the reception of a reception acknowledgment signal, too.

When multiplexed control data 1 that is the first multiplexed control data is input into the control data processing section 701, the control data processing section 710, as shown in FIG. 9, accumulates the multiplexed control data 1 in the multiplexed data accumulation section 108, and the control data processing section 710 starts a timer 702.

Until the timer 702 expires, the control data processing section 701, as shown in FIG. 9, successively accumulates multiplexed control data output from the control data management section 102 into the multiplexed data accumulation section 108. Now, here, it is supposed that, for example, three multiplexed control data of multiplexed control data 1-3 were accumulated during the period of time from the starting of the timer 702 to the expiration of the timer 702.

After the control data processing section 701 received a reception acknowledgment signal at t13 shown in FIG. 9, the control data processing section 701 takes out all the multiplexed control data (the multiplexed control data 1-3) that have been accumulated till that time from the multiplexed data accumulation section 108 at t14, the point of time when the timer 702 expired, and the control data processing section 701 adds a sequence number, an error detection code and the like to the taken out control data to generate them as one packet, and further the control data processing section 701 outputs the packet to the transmission section 109. After outputting, the control data processing section 701 clears the multiplexed data accumulation section 108, and restarts the timer 702.

Incidentally, the prescribed time set in the timer 702 is set in order that the transmission efficiency becomes highest under the consideration of the generation timing of multiplexed control data.

As described above, the communication apparatus and the communication method according to the present embodiment do not transmit control data that were multiplexed between a plurality of groups at the time of the reception of a reception acknowledgment signal, but the communication apparatus and the communication method transmit the control data at a prescribed time interval. Thereby, in a case where the generation frequency of multiplexed control data is high, or in similar cases, the number of times of exchanges of control signals can further be reduced, and the transmission efficiency of the control signals can be heightened in comparison with Embodiment 2. Consequently, the period of time necessary before the transmission starting of stream data can further be shortened.

Incidentally, in the aforesaid Embodiment 1 to Embodiment 3, descriptions are given to the cases where transmission paths are ones for radio communication, but the present invention does not limited such cases. The transmission paths may be ones for wired communication.

Moreover, when an error was generated during the transmission of control data, it becomes necessary to retransmit the control data in which the error was generated. Consequently, the aforementioned Embodiment 1 to Embodiment 3 in which a plurality of control data are multiplexed to be one packet and the packet is transmitted are especially effective in a communication system such that errors are easily generated. Moreover, by the use of the communication apparatus according to the aforesaid Embodiment 1 to Embodiment 3 on both of the transmission side and the reception side, waiting times are likewise shortened on both the sides, and the gaps of operation timing on both the sides are eliminated. Thereby, real time two-way communication becomes possible.

Moreover, it is also possible to realize the aforesaid Embodiment 1 to Embodiment 3 by means of software. In addition, it is also possible to store the software in a memory medium for the execution by a computer after the reading out of the software.

As described above, the present invention can shorten a waiting time concerning the transmission of control data, and thereby can reduce the delay of the starting of the transmission of stream data.

This application is based on the Japanese Patent Application No. HEI 11-309005 filed on Oct. 29, 1999, entire content of which is expressly incorporated by reference herein.

INDUSTRIAL APPLICABILITY

The present invention is applicable to a base station apparatus used in a radio communication system and a communication terminal apparatus.

The invention claimed is:

1. A multimedia communication apparatus that transmits control data to start transmitting stream data comprising an image stream or a voice stream, said apparatus comprising:
 an accumulator that accumulates a plurality of groups into which a plurality of control data are classified, each group comprising data that can be transmitted simultaneously;
 a determiner that determines to which group each of said plurality of control data belongs;
 a multiplexer that multiplexes control data determined to belong to a same group so as to generate multiplexed control data; and
 a transmitter that transmits said multiplexed control data in one transmission unit.

2. The multimedia communication apparatus according to claim 1, wherein said accumulator accumulates, in the same group, first control data that can be transmitted without waiting for response data from a communication partner to second control data.

3. The multimedia communication apparatus according to claim 1, wherein:
 the multiplexer further multiplexes a plurality of said control data to generate further multiplexed control data; and
 the transmitter transmits the further multiplexed control data in one transmission unit.

4. The multimedia communication apparatus according to claim 1, further comprising a timer that repeatedly measures a predetermined time period, wherein said transmitter transmits for every time period the multiplexed control data generated for the time period.

5. A multimedia communication method that transmits control data to start transmitting stream data comprising an image stream or a voice stream, said method comprising:
 accumulating a plurality of groups into which a plurality of control data are classified, each group comprising data that can be transmitted simultaneously;
 determining to which group each of said plurality of control data belongs;
 multiplexing control data determined to belong to a same group so as to generate multiplexed control data; and
 transmitting said multiplexed control data in one transmission unit.

6. A multimedia communication apparatus comprising:
 a multiplexer that packages first control data and second control data to generate first packaged control data; and
 a transmitter that transmits the first packaged control data, wherein
 the second control data is a message capable of being transmitted without a wait for response data from a communicating partner to the first control data.

7. The multimedia communication apparatus according to claim 6, wherein the first control data and the second control data include H.245 messages.

8. The multimedia communication apparatus according to claim 6, wherein the first control data includes a master slave determining message and the second control data includes a terminal ability information exchanging message.

9. The multimedia communication apparatus according to claim 6, wherein the first control data and the second control data are collectively transmitted.

10. A multimedia communication method comprising:
 packaging first control data and second control data to generate first packaged control data; and
 transmitting the first packaged control data, wherein
 the second control data is a message transmitted without a wait for response data from a communicating partner to the first control data.

11. The multimedia communication method according to claim 10, wherein the first control data and the second control data include H.245 messages.

12. The multimedia communication method according to claim 10, wherein the first control data includes a master slave determining message and the second control data includes a terminal ability information exchanging message.

13. The multimedia communication method according to claim 10, wherein the first control data and the second control data are collectively transmitted.

14. The multimedia communication apparatus according to claim 6, wherein:
 the multiplexer packages third control data and fourth control data to generate second packaged control data, after the first packaged control data is generated and response data to the first packaged control data is received from the communicating partner; and
 the transmitter transmits the second packaged control data.

15. The multimedia communication method according to claim 10, further comprising:
 packaging third control data and fourth control data to generate second packaged control data; and
 transmitting the second packaged control data, wherein:
 the step of packaging the third control data and fourth control is performed after the first packaged control data is generated and response data to the first packaged control data is received from the communicating partner.

* * * * *